United States Patent [19]

Okita

[11] 4,225,547

[45] Sep. 30, 1980

[54] EXTRUSION PROCESS OF POLYTETRAFLUOROETHYLENE TUBING MATERIALS AND APPARATUS THEREFOR

[75] Inventor: Koichi Okita, Osaka, Japan

[73] Assignee: Sumitomo Electric Industries, Ltd., Osaka, Japan

[21] Appl. No.: 944,682

[22] Filed: Sep. 22, 1978

Related U.S. Application Data

[63] Continuation of Ser. No. 750,318, Dec. 14, 1976, abandoned.

[30] Foreign Application Priority Data

Dec. 15, 1975 [JP] Japan .................................. 50-149718
Sep. 22, 1976 [JP] Japan .................................. 51-114006

[51] Int. Cl.² .............................................. B29F 3/08
[52] U.S. Cl. .................................. 264/127; 264/209; 264/312; 264/323
[58] Field of Search ................ 264/127, 209, 323, 312

[56] References Cited

U.S. PATENT DOCUMENTS

| | | | |
|---|---|---|---|
| 2,945,265 | 7/1960 | Sell | 264/127 X |
| 3,008,187 | 11/1961 | Slade | 264/209 X |
| 3,260,774 | 7/1966 | Harlow | 264/127 X |

OTHER PUBLICATIONS

Flow Properties of Polymer Melts, Brydson, J.A., The Plastics Institute, London, 1970, pp. 63–88.

*Primary Examiner*—Thomas P. Pavelko
*Attorney, Agent, or Firm*—Sughrue, Rothwell, Mion, Zinn, and Macpeak

[57] ABSTRACT

This application relates to a paste extrusion process using a ram type extruder wherein at least one, preferably both, of the die and mandrel of the extruder are rotated, in opposite directions when both are rotated. In preferred embodiments, the material being extruded is polytetrafluoroethylene, the mandrel has a smooth surface and the end portion of the die is heated.

11 Claims, 5 Drawing Figures

EXTRUSION PROCESS OF POLYTETRAFLUOROETHYLENE TUBING MATERIALS AND APPARATUS THEREFOR

This is a continuation application of Ser. No. 750,318, filed Dec. 14, 1976, now abandoned.

FIELD OF THE INVENTION

This invention relates to a method and apparatus for extruding polytetrafluoethylene tubing materials.

DESCRIPTION OF PRIOR ARTS

At present, extrusion molding of tubes, pipes, covered electric wires etc. with polytetrafluoroethylene resin is carried out mainly in accordance with a paste extrusion method. As is well known in the art, polytetrafluoroethylene resin is considerably excellent in heat resisting property, corrosion resistance, and electrical characteristic; however, it is low in workability, and especially, unlike ordinary plastics, it is impossible to extrude or roll the polytetrafluoroethylene resin in fluid state or to soften it by heating. In order to overcome this difficulty, the above-described paste extrusion method has been provided. In this method, in order to give fluidity to unsintered polytetrafluoroethylene resin powder at a temperature around room temperature, liquid lubricant such as naphtha, white oil, toluole, etc. is mixed with the polytetrafluoroethylene resin powder, and the mixture thus obtained is subjected to compression molding in advance so as to facilitate its supply to an extruder, and in addition the mixture thus treated is put in the cylinder of a ram type extruder so that it is extruded under pressure by the ram.

Although the polytetrafluoroethylene resin will show fluidity with the aid of the liquid lubricant, the number in kind of such polytetrafluoroethylene resin is limited when compared with that of heated ordinary thermoplastic resin. Accordingly, it is not suitable to employ a screw type extruder for extrusion of the polytetrafluoroethylene resin, which is usually used for extrusion. Furthermore, in the case of the ram type extruder, the pressure required for extrusion is very high, and the reduction rate of the die is no more than 2000. Since the fluidity is strictly limited, the shape designs of the die and the mandrel are also limited to simple ones. The tube extruded in this way is still in unsintered state and contains the liquid lubricant; however, it has an appreciable strength in the extrusion direction, because the unsintered polytetrafluoroethylene resin becomes fibrous by a shearing force applied thereto when it passes through the die in the extrusion step. This fibrous state of the resin is so significant that it can be visually observed. Such a state is rarely observed in other resins, and is peculiar to the polytetrafluoroethylene resin. However, no fibrous state is observed in the direction perpendicular to the extrusion direction, and therefore in this direction the unsintered tube has little strength.

In the subsequent step, the unsintered tube is dried to remove the liquid lubricant, and is then sintered at a tempreature of approximately 330° C. or higher, as a result of which an air-tight polytetrafluoroethylene resin tube having sufficient mechanical strength is obtained.

SUMMARY OF THE INVENTION

The method of this invention relates to an improvement of the paste extrusion process. The method is characterized in that when a material molded under pressure in advance is shaped into a tube, a pipe or the like through the cylinder of a ram type extruder, at least one, preferably both, of the die and mandrel that are metallic wall means for obtaining the final shape thereof are rotated in opposite directions to achieve the extrusion. Therefore, the specific feature of the method is to provide a molded product which is made fibrous by the shearing force in the extrusion direction as well as fibrous in two dimensional directions by applying a shearing force positively in the direction perpendicular to the extrusion direction.

Accordingly, an object of the present invention is to make it possible to manufacture tubes or pipes which are higher in strength and elongation percentage than those manufactured by the conventional paste extrusion process. Another objcet of the invention is to manufacture products which have such properties not only in the longitudinal direction but also in the lateral direction. Accordingly, the diameter of an extruded product can be readily made greater after the extrusion.

When polytetrafluoroethylene resin or especially resin obtained by setting emulsion polymer, such as Teflon No. 6 made by U.S. Dupont Co., undergoes a shearing force caused by the extrusion from a die orifice, the rolling of rolls, a high rate agitation, etc. before sintering, the powder becomes fibrous and the fibers thus obtained tend to arrange in the mechanical direction such as the extrusion direction or the rolling direction. The fibrous state can be seen with the naked eye. This phenomenon is peculiar to the polytetrafluorothylene resin, and is not observed with other plastics.

The fibrous state formation described above is particularly significant when the resin includes lubricant.

The fibrous state formation is closely related to the strength of the resin, and relates completely to it before the resin is sintered. That is, in the resin in which no fibers are yet formed, its tensile strength is so low that it cannot be measured; while in the resin in which fibers are formed, its tensile strength is 2 Kg/mm$^2$ or higher.

As for elongation, if the fibrous state formation is not advanced to a certain extent, the extruded product will be cut with only a little elongation. If the product is suitably made fibrous, elongation more than 300% can be observed.

Furthermore, when the product is bent, if it is not sufficiently fibrous it will crack. On the other hand, if it is sufficiently fibrous it is flexible and strong enough to withstand the bending. This effect is observed in the fiber arrangement direction, but not in other directions.

The effect of the fibrous state formation can be observed in the case of sintered resin also. That is, in the case of polytetrafluoroethylene resin, if it is sintered after bending molded under pressure, it will be greatly cracked when sintered.

This difficulty can be overcome by making it fibrous by extrusion and rolling in advance. The resin made fibrous before sintering maintains the effect even after sintering. That is, it is excellent in tensile strength in the direction of the fibrous station formation, and is excellent also in bending resisting characteristic in that direction.

A sintered pipe obtained by the paste extrusion process will be described. If the pipe is held longitudinally and is repeatedly bent, it is liable to have cracks parallel to the longitudinal direction. If a pulsive internal pressure is exerted on the pipe, it will repeat expansion and contraction in the diametrical direction, which will lead to the occurence of cracks in the longitudinal direction. This is the drawback of the pipe produced by the paste extrusion process. This is due to the fact that the pipe is made fibrous in the longitudinal direction by extrusion, but it is not made fibrous in the direction perpendicular to the longitudinal direction.

In addition to the tensile strength and the bending resisting strength, there is a tearing resisting strength which depends greatly on the fibrous state regardless of whether the resin is sintered or not. That is, in the case where the fibers are oriented in one direction only, if the product is torn in such a manner that the crack runs in the direction perpendicular to the direction of the fiber arrangement, it will show a considerably great resistance; however, if it is torn in such a manner that the crack runs in the direction parallel with the fiber arrangement, it can be readily torn.

As was described above, fibers are formed and arranged in polytetrafluoroethylene resin before sintering. This fact is very important, and is peculiar to the polytetrafluoroethylene resin, not to other plastics.

As was described before, pipes or electric wire covers are not made fibrous before extrusion molding in the conventional paste extrusion process. Therefore, in such pipes molded by extrusion but not sintered yet, fibers are formed and oriented only in the extrusion direction, or the longitudinal direction, while fibers scarcely run in the direction perpendicular to the extrusion direction. Accordingly, when it is pulled longitudinally, it will show a considerably great strength; however, when pulled in the direction perpendicular to the longitudinal direction, it will be readily cut off, that is, it is scarcely elongated. Furthermore, before it is sintered, it is cracked in the longitudinal direction by only one slight bending. As the diameter increases, this tendency is strengthened, and becomes significant especially when the wall thickness decreases. Therefore such products must be handled with great care until they are sintered. If the diameter of a product is larger than 10 mm, it is necessary to arrange the extruding, drying and sintering devices on a straight line.

Furthermore, it is impossible to make the diameter of such a product molded by extrusion larger or smaller in the unsintered state. That is, if it is deformed to increase the diameter, is will be cracked in the longitudinal direction even by slight deformation; and the degree of decreasing the diameter is limited to a very small range.

These pipes are, even after sintering, liable to crack in the longitudinal direction by repetitive bending and internal pressure change and by variation in diameter due to the former. In addition, as the lateral strength and elongation are small when compared with the longitudinal ones, if the pipe is used under internal pressure, it is disadvantageous in design.

When the pipe is expanded by the applicaiton of internal pressure into a hollow product having a greater diameter, it is liable to be cracked during the process.

The present invention aims at the provision of a novel process in which, as was described above, all of the drawbacks accompanying the pipes or the like manufactured by the conventional extrusion process are eliminated, the strength of the product in the unsintered state is improved, thereby to prevent the occurrence of defects after extrusion, the workability of the product in the unsintered state is improved to make it possible to increase or decrease the diameter, and the bending resisting characteristic and the strength in the diametrical direction of the product are improved.

In the method according to the invention, unsintered polytetrafluoroethylene resin and liquid lubricant are mixed to form a mixture, which is subjected to preliminary compression molding, and the mixture thus treated is loaded in a ram type extrusion cylinder and is extruded into a tube or a pipe through the gap between a mandrel coupled to a drive section and a die or die-land connected to a rotation drive secton.

Especially when the resin mixture is extruded while being heated, (a) the temperature of the die or the die-land for determining the product's final shape is set at a temperature higher than the temperature of the mixture, preferably the temperature difference therebetween being higher than 50° C., and (b) the mandrel and the die or die-land are rotated thereby to make the product fibrous in the direction perpendicular to the extrusion direction. Thus, improved tubing materials can be provided according to this invention.

As conducive to a full understanding of the invention, a detailed description will be made with reference to the accompanying drawing.

DESCRIPTION OF PREFERRED EMBODIMENTS

Figure 1:
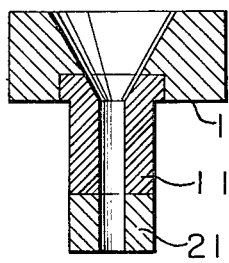
FIG. 1 is a longitudinal sectional front view showing a die assembly for regulating the outside diameter of a tube.

FIG. 1 shows a die adapted to regulate the outside diameter of a tube. The die may be made of a single block of material such as steel. In this case, the whole item shown in FIG. 1 is called a die. On the other hand, necessary parts fabricated separately may be assembled into the die. In this case, the assembly of a die 1 in a narrow sense and a die-insert 11 is called a die in a broad sense. Furthermore, the assembling parts may be subdivided. That is, the foot of the die-insert may be separately provided. The part corresponding to the foot of the die insert will be referred to as "a die-land 21".

In general, the definition of a die-land means the distance between the point where the upper tapered surface formed by drilling a metal block has the dimension of the final shape of a product and the tip end of the foot. However, the part 21 will be referred to as a die-land for convenience in description.

Figure 2:
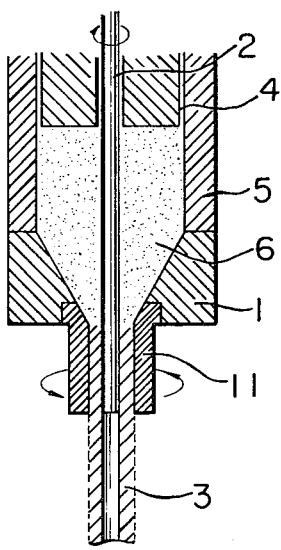
FIG. 2 is a longitudinal sectional front view illustrating a ramp type extruder for practicing this invention.

In a device shown in FIG. 2, an extrusion unit obtained by assembling the die 1 in a narrow sense and the die-insert 11 is combined with a mandrel 2, a ram 4 and a cylinder 5 to form a metal extrusion mold.

A material 6 molded under pressure in advance (hereinafter referred to as "a primary material or product 6" when applicable) is charged into the cylinder, and is formed into a tube 3 by the downward movement of the ram 4. If in this operation the mandrel 2 or the die-insert 11 is rotated, or more preferably the mandrel 2 and the die-insert 11 are both rotated in opposite directions while the primary material 6 is being extruded, the extruded tube 3 becomes fibrous not only in the extrusion direction but also in the direction perpendicular to the extrusion direction, that is, in two different directions owing to the shearing force generated by the rotating metal walls.

The degree of the fibrous state of the product in the direction perpendicular to the extrusion direction depends on the sectional area of the cylinder 5, the downward movement rate of the ram 4, the heating temperature, the shape of the mandrel 2, the opening angle of the die 1 and the die-insert 11, and the length of the die-land 21, and therefore cannot be represented by a simple numerical value. However, the degree of the fibrous state in question increases as the rotation of the die-insert 11 or the mandrel 2 increases.

The shearing force due to rotation is generated by the contact surfaces of the metal walls, namely, the die-insert 11 and the mandrel 2, and the primary material 6. However, the shearing forces generated by the part where the product is formed into the final shape and by the part through which the product passes thereafter are effective for making the tube 3 fibrous in the direction perpendicular to the extrusion direction, and the shearing force generated before the product is formed into the final shape is less effective for making the product fibrous in the direction perpendicular to the extrusion direction. On tne other hand, when an excessively fibrous material is mixed with the primary material 6, the fibrous condition of the former material is different from the fibrous condition of the latter material obtained by the shearing forces caused by the metal surfaces of the die-insert 11 and the mandrel 2. Therefore, sufficiently fibrous layers and insufficiently fibrous layers are mixedly provided in the direction of thickness of the tube 3, and the tube has little strength in the interfaces of these layers. This means that the pipe is unstable in strength characteristic in the longitudinal direction thereof.

Thus, the fibrous-state formation in the extrusion direction is first effected until the sectional area of the material 6 being extruded is gradually reduced and finally the tube 3 having the final shape is formed, and then the fibrous-state formation in the tube 3 in the direction perpendicular to the extrusion direction is effected by the rotating shearing forces due to the die-inert 11 and the mandrel 2 without changing the sectional area of the tube 3 being extruded.

When only the mandrel 2 out of the metal walls adapted to regulate the final shape of the product is rotated, the direction of the fibers on the inner surface of the tube 3 has an angle with respect to the extrusion direction. This angle increases as the rotation of the mandrel increases and the extrusion rate decreases. On the other hand, when only the die-insert is rotated, the direction of the fibers on the outer surface of the tube 3 has a certain angle with the extrusion direction. If it is assumed that the rotation speed of the mandrel 2 is equal to that of the die-insert 11, the latter case where only the die-insert is rotated is more effective than the former case where only the mandrel 2 is rotated, because the contact area with the metal wall in the latter case is larger than that in the former case.

Figure 3:
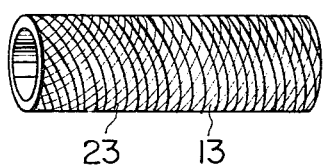
FIG. 3 is a perspective view showing the directions of fibers in an extruded tube.

When the die-insert 11 and the mandrel 2 are rotated in opposite directions, as for instance the die-insert 11 is rotated clockwise and the mandrel 2 is rotated counter-clockwise, the directions of the fibers on the inner and outer surfaces of the tube 3 have angles with respect to the extrusion direction, respectively, while the angles of the directions of the fibers on the inner and outer surfaces of the tube increase as shown in FIG. 3 by way of example.

Figure 4:
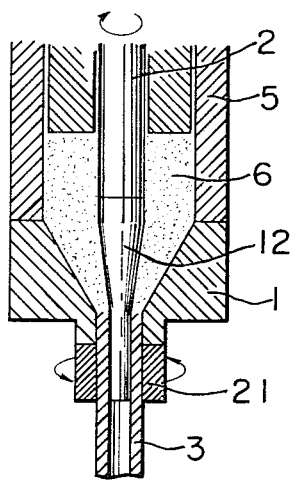
FIG. 4 is also a longitudinal sectional front view (partially omitted) showing a modified extruder according to the invention.
Figure 5:
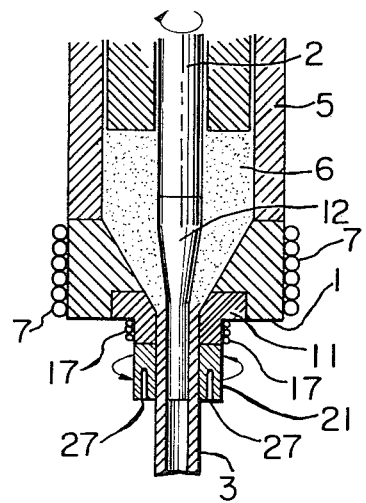
FIG. 5 is another modificaiton of the extruder according to the invention.

In FIG. 3, the solid line 13 indicates the direction of the fibers on the outer surface of the tube 3, while the dotted line 23 indicates the direction of the fibers on the inner surface of the tube 3. A turning force or a turning shearing force of the metal wall adapted to determine the final shape of the product in which the sectional area in the extrusion direction is no longer changed induces the fibrous-state formation in the direction perpendicular to the extrusion direction. Therefore, a device in which the die-land 21 is rotated is shown in FIGS. 4 and 5. In each of the embodiments in FIGS. 4 and 5, as the length of the die-land 21 is increased, the effect to the fibrous-state formation in the perpendicular direction is increased. However, in the case where the length of the die-land 21 is decreased, the similar effect can be obtained by increasing the rotation speed of the die-land 21.

In order to accelerate the fibrous-state formation in the direction perpendicular to the extrusion direction, it is preferable to provide a die-land 21 whose opening diameter is about 2–10% smaller than the opening diameter of the die 1. However, in the embodiment in FIG. 4, if the opening diameter of the die-land 21 is reduced by 15% or more of the opening diameter of the die 1, part of the load pressure required for extrusion is applied directly to the die-land, as a result of which it is considerably difficult to keep the die 1 in close contact with the die-land 21. The embodiment of FIG. 5 eliminates this problem. For this purpose, provided in FIG. 5 are a heater 7 for heating the material 6 and heaters 17 and 27 for heating the tube 3 having the final shape. The temperature of the tube 3 is made higher, preferably 50° C. or higher, than the temperature of the material 6 by the heaters 17 and 27 so that upon formation of the tube 3 from the material 6, the tube 3 is subjected to thermal expansion. The fibrous-state formation in the direction perpendicular to the extrusion direction is accelerated in proportion to the degree of the thermal expansion.

If in addition to the mandrel 2, a core pin 12 is made as a metal wall for defining the inside diameter of the tube 3, it is possible to transmit the turning force of the mandrel 2 as the turning force of the core pin 12. This is suitable for changing the inside diameter of the tube 3.

All of the liquid lubricants employed in the conventional paste extrusion process can be used as the liquid lubricant in the method according to this invention. The blending quantity can be selected similarly as in the conventional paste extrusion process. That is, a variety of materials such as naphtha, hydrocarbon oil such as white oil, aromatic hydrocarbon oil such as toluole, ketone, alcohol and ester can be employed. Usually, 10–30 parts of liquid lubricant is blended with 100 parts of resin. Furthermore, it is possible to blend various materials such as filler, metal powder, metallic acids, carbon, and glass fibers for the purpose of coloring, reinforcement ect.

The mixture of unsintered polytetrafluoroethylene resin powder and liquid lubricant can be molded under pressure in advance completely similarly as in the conventional paste extrusion process.

The effects obtained when the die or the mandrel is rotated, will be described.

The extrusion of tubes, pipes and electrical wires frequently suffers from thickness deviation and center deviation. However, the thickness deviation and center deviation of the extruded product can be completely eliminated by rotating the mandrel or the wire guide tube from the start of the extrusion, because in the case of rotating the mandrel, the position thereof where the thickness deviation and center deviation are minimized under the static water pressure load coincides with the most stable position.

The static water pressure required for extrusion can be observed as the load pressure to the ram. However, when one or both of the die and mandrel start to rotate, the extrusion load pressure is decreased, that is, the extrusion load pressure is reduced to 70% of the extrusion load pressure obtained when the rotation speed is zero. This is due to the fact that the load pressure of about 30% is given by the rotating metal wall in order to change the paste-like mixture of the polytetrafluoroethylene resin powder and the liquid lubricant from the primary material to the final product, and the fact that while the paste-like mixture lowers the fluidity by orienting the fibers in one direction, or in the extrusion direction, the fluidity is improved by orienting the fibers in two directions, that is, in the extrusion direction and in the direction perpendicular to the extrusion direction.

If the rotation speed is further increased, the extrusion load pressure begins to increase, and finally becomes greater than the extrusion load pressure obtained when the rotation speed is zero.

This tendency is accelerated as the temperature of the premolded material is increased, and finally the extrusion becomes impossible. However, if the temperature of the insert die or the die-land is increased and the temperature of the premolded material is made lower than the increased temperature of the insert die or the die-land, a continuous extrusion can be carried out and the fibrous-state-making in the direction perpendicular to the extrusion direction is accelerated.

The working temperature is closedly related to the degree of the fibrous state formation. In general, the fibrous state formation is accelerated as the working temperature increases. However, if the fibrous state formation is extremely advanced before the product has the final shape, it loses fluidity, as a result of which the extrusion becomes impossible. Therefore, the condition of heating the premolded material affects the fibrous state formation in the extrusion direction of the tube, while the condition of heating the insert die or the die-land mainly affects the fibrous state formation of the tube in the direction perpendicular to the extrusion direction.

By selecting these temperature conditions, products different in the degree of fibrous state formation in the two dimensional directions can be manufactured. In this connection, if the temperature difference is made to be 50° C. or higher, uniform fibrous state formation can be obtained in the two different directions.

The condition of the fibers of unsintered resin arranged in the direction approximately perpendicular to the final extrusion direction can considerably improve the lateral strength and elongation of the pipe molded by extrusion. In the product formed by the conventional extrusion process, the fibrous state of resin is observed only in the extrusion direction as was described before, and the strength in the lateral direction is, in general, of the order of 0.01 Kg/mm$^2$, that is, it is so small that it is difficult to measure the strength. In addition, the elongation is less than 10%, and therefore the product will be readily cracked by slight deformation. On the other hand, in the product formed according to the process of this invention the fibrous state is observed both in the longitudinal and lateral directions. Although the strength is varied according to the reduction rate obtained when the product is extruded, it is not difficult to obtain a strength of 2.0 Kg/mm$^2$ and higher. Especially the elongation is remarkably improved to higher than 300%.

Conventional extruded products in the unsintered state must be handled with great care. For instance, thin wall pipes whose diameters are greater than 10 mm must be handled so that they are not bent and the walls are not cracked in the longitudinal directions by applying pressure in the diametrical directions. On the other hand, the pipes formed according to the process of the invention can withstand the bending force even if they are unsintered, and no longitudinal cracking is caused even if they are considerably deformed before sintering. Accordingly, defects which may be caused during the manufacturing process can be eliminated, and the unsintered products state can be bent to a certain degree, and therefore it is not always necessary to make a straight line from the extruder to the sintering furnace. Furthermore, where the product, such as covered electrical wires, is directed in several directions through pulleys for drying and sintering, no defect is caused even if it is bent when passing through the pulleys.

The effects which are obtained by rotating the wire guide tube instead of the core pin in the case of covering electrical wires will become more apparent from the following description. If the spark break-down portions of an electric wire covered with insulating material by the conventional paste extrusion process are observed with a microscope, it is frequently found that minute cracks and voids exist on the side of the insulating layer in contact with the conductor. Such cracks and voids are due to a number of factors mixed intricately with one another. The most important factor among them is whether or not the internal stress generated by the change in volume of the polytetrafluoroethylene resin before and after the phase transition accompanying the melting of the resin is equal to the tearing and tensile strengths of the insulating cover layer. In other words, the resin contraction percentage before and after sintering is proportional to the degree of the fiber orientation in the unsintered state. Accordingly, if the conductor is removed from the electric wire insulated by the ordinary paste extrusion and is subjected to sintering, a contraction of more than 30% is observed in the longitudinal direction of the wire, while a contraction of less than 5% is observed in the diametrical direction and sometimes the wire is expanded in the diametrical direction. If the sintering is carried out so as to prevent the contraction in the longitudinal direction, a contraction of 7 to 10% occurs in the diametrical direction; however, the contraction percentage is relatively low.

On the other hand, in the case where an electric wire is insulated by the process of the invention in which the wire guide tube is penetrated into the die-land and is rotated, and the conductor is removed therefrom, it is possible that the contraction percentages in the longitudinal and diametrical directions are less than 15% and more than 15%, respectively. If the sintering is carried out with the contraction in the longitudinal direction prevented, the contraction percentage in the diametrical direction can be made to be more than 30%. In this contraction, no minute cracks are created in the diametrical direction. These tendencies depend on how the fibrous state formation orientation advances in the longitudinal and diametrical directions, and as the degree of the fibrous state formation orientation increases, the contraction also increases and the tensile strength in that direction increases.

If the contraction in the longitudinal direction is forcibly fixed by the conductor, a tearing stress in the diametrical direction occurs. When the fibrous state formation orientation is weak in the diametrical direction, minute cracks are induced.

In electric wires covered by the conventional paste extrusion process, the extrusion is carried out in such a manner than the movement rate of the conductor is completely or substantially equal to that of the insulating cover layer, and therefore the outside of the insulating cover layer is made sufficiently fibrous by the shearing force caused by the metal wall die and the outside. On the other hand, the inside of the insulating cover layer is affected by the compression of the conductor and the static water pressure; however, a shearing force scarcely occurs with respect to the inside of the insulating cover layer, and therefore advancement of the fibrous state formation is decreased.

In electric wires covered according to the pipe extrusion process, the final thickness of the insulating cover layer is regulated by the die and the wire guide tube, and a shearing force is positively generated on the inside of the insulating cover layer by rotating the wire guide tube to enhance the fibrous state formation orientation. When the die and the wire guide tube are rotated in opposite directions, a greater effect can be obtained.

As a result, defective portions which might be subjected to spark breakdown are reduced on the conductor contact side of the insulating layer, and the conductor is in more effective close contact with the insulating layer, and therefore the corona resisting property can be improved. Thus, a long covered wire having stable properties can be manufactured.

The uniformity in the thickness direction of unsintered tubes or pipes according to the extrusion process of the invention can be clearly compared with tubes obtained by a conventional improved method having the same object.

According to Japanese Patent Publication No. 12479/1964, it is known that a smoothly curved surface having grooves and projections is formed on the tapered metal walls of the die and core pin, and the product passes through a process in which the direction of the fibers on the outer surface of the product is made to form an angle of at least 15 degrees with the direction of the fibers on the inner surface of the product, and then passes through a metal wall defining the final shape thereof.

In addition, according to Japanese Patent Publication No. 13625/1966 a method is known in which a material molded under pressure in advance is made fibrous in the direction perpendicular to the extrusion direction and is then extruded.

In these methods, the fibrous state formation is carried out in the direction perpendicular to the extrusion direction before the product has its final shape, and therefore the fibrous state formed is considerably spoiled during the process in which the product is shaped into the final shape. On the other hand, if the fibrous state formation is advanced too much before the product is finally shaped, the uniform filling in the thickness direction is not carried out and the product has some portions greater in mechanical strength than other portions, that is, the product is nonuniform in mechanical strength. This property will become significant when the product is elongated.

Even if it is tried to elongate such a tube 100% in the unsintered state, it is impossible to do so, that is, it is cut or shows a pattern like a bamboo shoot's sheath on its surface.

It is significant that a polytetrafluoroethylene resin layer, unlike other ordinary plastics, is poor in sticking property. The above-described pattern corresponds to the portions poor in sticking property in the thickness direction. If the elongation is continued until the tube is cut, the portion having poor sticking property is spread as the bamboo shoot's sheaths are peeled off and a number of torn pieces are created on the surface of the tube. On the other hand, in the case where an unsintered tube according to the extrusion process of this invention is elongated, no change is observed on its surface before it is cut. This proves that the mutual sticking property of polytetrafluoroehtylene resin is extremely uniform in the thickness direction of tubular products such as tubes.

Pipes extruded, similarly as in the conventional process, are dried or extracted to eliminate the lubricant, and are then sintered at a temperature higher than the melting point. Sintered pipes or the like obtained according to the process of the invention are excellent in bend resisting characteristic, and strength (especially strength in the lateral direction) when compared with those obtained by the conventional process. This is because the arrangement of fibers in the unsintered state affects the strength of the product after sintering. Pipes or the like according to the process of the invention have excellent lateral strength and accordingly a high pressure resistance characteristic, and therefore can withstand the repeated elongation and bending of the diameter due to a variable internal pressure. More specifically, a tubular product made according to the conventional method shows a longitudinal strength of 3 to 4 $Kg/mm^2$; however, its lateral strength is lower than this, that is, it is 2 to 3 $Kg/mm^2$. Thus, the difference between the longitudinal strength and the lateral strength is great. On the other hand, according to the process of this invention, it is possible to make the lateral strength approximately equal to the longitudinal strength. Thus, according to the invention, a product balanced in strength can be obtained. Since the durability against bending changes greatly according to the size and extrusion rate of a product, it is difficult to express the durability by a single number; however, the durability of the product according to the invention is three to six times as great as that of the product according to the conventional process. Especially in the case when a crack occurs in a product, a great difference is observed between the product of the invention and the product of the conventional method in the advancement of the crack. In the product of the conventional method, the crack extends readily, while the improved product shows an elongation at the end and in fact the extending of the crack is prevented. Furthermore, in the case where a pipe is heated and pressurized to increase its diameter or to be formed into a bellows, the lateral elongation is great, that is, it is possible to elongate it 300% or more. In addition, even if a small flaw is created in a product, the flaw scarcely grows. Therefore, the diameter expanding range can be increased, which facilitates the working of the product.

Another specific feature of the invention will be described. As was described before, pipes or the like extruded by the process of this invention have excellent lateral strength even in the unsintered state. This makes it possible to further process the pipes in the unsintered state. This is a merit of the invention in addition to the above-described ones. The term "processing" used herein means the expansion or contraction of the diameter of the pipe.

In the case of a hollow product obtained according to the conventional extrusion process, it is rather difficult to change the diameter thereof in the unsintered state even if it is carried out with great care. More specifically, during the process of changing the diameter, the product is liable to be cracked or torn in the extrusion direction.

On the other hand, in the case of a hollow product obtained according to the extrusion process of this invention, a variety of processes can be applied to the hollow product without causing any damage, such as cracks. These processes can be more readily achieved when the lubricant is contained in the product. Furthermore, under this condition, the range of process is wide. However, it should be noted that the product can be processed even after the lubricant has been removed from the product by drying.

In these cases, if the process is difficult at room temperature, it may be more easily carried out by heating the product. However, the product containing the lubricant has sufficient workability at room temperature.

The contents of the processes will be described. For instance, as methods of expanding the diameter there are a method using a bullet type mold whose outside diameter is greater than the inside diameter of the extruded article, which is passed through the hollow part thereof, a method in which a bar or a roll is passed through the hollow part and the diameter is expanded by rolling the extruded material between the roll and a flat plate or another roll, a method in which the diameter is expanded by pulling a plurality of bars inserted into the hollow part, a method in which an air bag inserted in the hollow part is expanded, and so forth. As methods of contracting the diameter there are a method in which the extruded article is elongated in the longitudinal direction, a method of passing the die, and so on. The product thus subjected to the secondary process is sintered by being heated at a temperature higher than 327° C. after being dried if necessary.

By the above-described processes, in the unsintered state of the extruded product, a variety of molded products can be obtained which have not been provided. For instance, in the process of expanding the diameter, a pipe whose wall thickness is thin and whose diameter is considerably greater than that of the extruded product can be obtained. In the conventional method, in order to provide a pipe having a large diameter it is necessary to provide an extruder having a diameter corresponding to such large diameter. The diameter of a pipe which can be extruded by the extruder is less than the diameter of the cylinder thereof. Furthermore, since the material employed in the conventional method, unlike ordinary plastics, is low in fluidity, if the wall thickness of the extruded pipe is not increased according to the diameter, it will suffer from wall thickness deviation, bending and cracking, which leads to difficult work in the manufacturing of pipes. For instance, a pipe 100 mm in diameter needs a wall thickness on the order of 2 mm. On the other hand, in the extrusion process of this invention, the wall thickness deviation and bending of a hollow pipe are prevented without biasing the position of the mandrel adapted to form the hollow in the pipe, and therefore it is possible to produce a molded product which has a thinner wall thickness than the conventional one. Furthermore, by expanding the diameter of the product thus produced by the above-described method, a pipe having a thinner wall thickness and larger in diameter than the extruder cylinder can be manufactured. For instance, if a pipe 50 mm in outside diameter and 2 mm in wall thickness is extruded and is then expanded to have a diameter of 250 mm, the wall thickness thereof will be about 0.4 mm. In manufacturing expensive polytetrafluoroethylene resin pipes, pipes manufactured according to the process of this invention which are thin in wall thickness when compared with the diameters thereof have great commercial value. In addition, thin wall thickness pipes having larger diameters are considerably useful as corrosion resistive and non-adhesive covers for metal rolls or the like.

If after extrusion an extruded pipe is elongated in the longitudinal direction, the extruded pipe will have a diameter smaller than the extrusion diameter. Therefore, by changing the degree of such elongation a variety of pipes different in diameter can be obtained by using only one die. In addition, where it is difficult to produce a thin pipe by extrusion only, a thin pipe can be obtained by elongation after extrusion.

There are differences between the case in which an extruded product is subjected to elongation or diameter expansion after being sintered and the case in which an extruded product not yet sintered is subjected to elongation or diameter expansion. In the former case it is necessary to heat the extruded article. If the extruded article is elongated or expanded approximately at room temperature, a considerably great force is required for the elongation or expansion. For polytetrafluoroethylene resin with a high softening point, it is desirable to heat the extruded product to a temperature higher than 200° C. However, at such a high temperature a number of problems arise with the apparatus and working conditions. On the other hand, in the process according to the invention the above-described elongation and expansion can be carried out approximately at room temperature, although sometimes the process may be facilitated by heating.

In the case where the sintered product has been deformed, if it is heated again, its deformed shape will be restored to the original shape. The same phonomenon also occurs where such deformation is carried out at a temperature higher than the melting point of 327° C. In this regard, polytetrafluoroethylene resin is greatly different from other plastics. When the unsintered product is deformed as in the invention, a part of the deformation effected by contraction due to the sintering tends to return to the original state; however, its returning degree is small when compared with that in the deformation after sintering. Therefore, the effective, permanent deformation of the product can be provided. The deformation effected before sintering and especially the deformation effected in the state containing the lubricant are greater in degree than the deformation effected after sintering. For instance, the diameter of a sintered pipe may be expanded up to three to four times at the most, while the diameter of an unsintered pipe containing the lubricant can be expanded to ten times or more by rolling or the like.

In addition, the contraction percentage of a product which has been expanded after sintering is greater than the expansion percentage thereof. Therefore, products having an excellent close contact characteristic and a great cover strength, when compared with the contraction of tubes or pipes, can be obtained.

As is apparent from the above description, the present invention eliminates the drawbacks of pipes or the like obtained by the conventional extrusion molding process, that is, the invention improves the strength in the diametrical direction of the conventional pipe or the like, sintered or not sintered, to thereby provide an extruded product which has excellent bending resistance and pressure resistance characteristics, and furthermore makes it possible to elongate and expand the extruded product in the unsintered state. Thus, the present invention contributes to the provision of a variety of products which cannot be produced by the conventional process.

The invention will be further described with reference to concrete examples; however, it should be noted that the invention is not limited thereby or thereto.

REFERENCE EXAMPLE 1

Three (3) Kg of polytetrafluoroethylene resin fine powder (Teflon 6J made by Mitsui Fluorochemical Co.) available on the market and 0.84 Kg of white oil (Smoil P-55, Muramatsu Sekiyu Co.) were uniformly mixed by an ordinary method, and a cylindrical primary product 88 mm in outside diameter and 21 mm in inside diameter was made under a molding pressure of 30 Kg/cm$^2$. This primary product was loaded in a paste extrusion molding machine having an inside cylinder diameter of 90 mm, a mandrel outside diameter of 20 mm, a die inclination angle of 60°, a die-insert with an opening diameter of 8 mm and a die-land of 120 mm, and a core pin outside diameter of 6 mm. The die and the insert die were heated at 40° C. While rotating the mandrel and the core pin at 40 rpm., the static water pressure was loaded by the oil pressure. When the pressure reached 150 Kg/cm$^2$, a tube with no wall thickness deviation was extruded at a rate of 1 m/min. Then, a stationary state was obtained at the extrusion pressure of 299±30 Kg/cm$^2$.

When the rotation of the mandrel was suspended, the extrusion pressure increased to 350±40 Kg/cm$^2$. When the die insert and the mandrel were rotated in opposite directions at 30 rpm., the extrusion pressure decreased to 295±25 Kg/cm$^2$ and stabilized. When the mandrel was rotated at 40 rpm. with the die insert continuously rotated, the extrusion pressure was changed to 300±20 Kg/cm$^2$.

The tube thus extruded was immersed in trichloroethylene, and then the tube was taken out of the solution and subjected to measurements of tensile strength and break-down strength. The break-down strength was obtained from the pressure obtained when an unsintered tube connected to a conduit pipe was broken by an increasing internal pressure.

Then, the tube was held so as not to cause any longitudinal contraction, sintered at 360° C. for 10 minutes, and subjected to measurements of its inside diameter and its tensile strength.

The measurement values in this case are indicated in Table 1 below:

TABLE 1

| Extruding Condition rpm | | | Unsintered | | Sintered | |
|---|---|---|---|---|---|---|
| Mandrel rpm | Die rpm | Pressure Kg/cm$^2$ | Tensile strength Kg/mm$^2$ | Breakdown strength Kg/cm$^2$ | Inside diameter mm | Tensile strength Kg/mm$^2$ |
| 40 | 0 | 290 | 0.80 | 0.60 | 5.4 | 4.0 |
| 0 | 0 | 350 | 0.36 | 0.28 | 6.5 | 1.8 |
| 0 | 30 | 295 | 0.62 | 0.55 | 5.7 | 3.1 |
| 40 | 30 | 300 | 1.72 | 0.75 | 5.0 | 8.6 |

When the sintered tube is cut open and is bent in opposite directions, white fibers appear, but a tube first extruded or produced without rotation shows only parallel fibers. On the other hand, where the mandrel was rotated fibers forming an angle of about 10 degrees with the extrusion direction were observed on the inner surface of the tube; in the case where the die insert was rotated fibers forming an angle of about 8 degrees with the extrusion direction were observed on the outer surface of the tube; and in the case where the mandrel and the die insert were rotated fibers forming an angle of about 15 degrees with the extrusion direction were observed.

A cut was made on the tube in the extrusion direction and both ends of the tube were pulled in opposite directions to test its tearing resistance strength. The tube produced without turning the die and the mandrel was most readily torn. Next to this tube was a tube manufactured by turning either the die or the mandrel. It was most difficult to tear a tube manufactured by turning both the die and the mandrel.

EXAMPLE 1

Four (4) Kg of Teflon 6C (fine powder made by E.I. duPont Co.) and 0.80 Kg of Deobase were uniformly mixed, and a thin tube was made by a method similar to the method in Reference Example 1 in which the mandrel outside diameter was 4 mm, the die inclination angle was 60° and the die insert had an opening diameter of 5.5 mm and a die-land of 70 mm.

In this example, the mandrel was rotated at 44 rpm. With the die heated at 30° C., the die insert was heated at 50° C., 80° C. and 110° C. The resultant data are shown in Table 2 below.

The tearing strength after sintering was the strength required to tear the tube into two parts.

TABLE 2

| Extruding Condition | | Unsintered | | Sintered | |
|---|---|---|---|---|---|
| Die insert temperature °C. | Pressure Kg/cm$^2$ | Tensile strength Kg/mm$^2$ | Tearing strength Kg/ply | Tensile strength Kg/mm$^2$ | Tearing strength Kg/ply |
| 50 | 570 | 1.62 | 0.98 | 5.0 | 1.9 |
| 80 | 570 | 2.15 | 1.06 | 5.5 | 2.5 |
| 110 | 560 | 2.40 | 1.10 | 5.9 | 3.3 |

EXAMPLE 2

Three (3) Kg of Fluon CD-1 (fine powder made by Imperial Chemical Co.) and 0.78 Kg of Smoil P-55 were mixed, and extrusion was carried out with the same die mandrel and die insert as those of Example 1. The temperatures of the die and the die insert were set at 40° C., and 110° C., respectively. The revolution per minute (rpm) of the mandrel was varied as indicated in Table 3.

When the rpm of the mandrel was zero (0), the wall thickness of the tube was greatly deviated; but when the rpm of the mandrel was 22 rpm and higher, no wall thickness deviation was observed. As the tearing strength of the unsintered tube was high, measurement was conducted by sintering only the end of the tube.

TABLE 3

| Extruding Condition | | Unsintered | | Sintered |
|---|---|---|---|---|
| Mandrel rpm rpm | Pressure $Kg/cm^2$ | Tensile strength $Kg/mm^2$ | Tearing strength Kg/ply | Tensile strength $Kg/mm^2$ |
| 0 | 350 | 2.2 | 0.75 | 9.1 |
| 22 | 325 | 3.3 | 1.05 | 10.7 |
| 50 | 380 | 4.2 | 1.10 | 11.3 |
| 55 | 390 | 4.1 | 1.25 | 11.9 |
| 65 | 408 | 5.2 | 1.50 | 12.3 |
| 75 | 420 | 4.9 | 1.75 | 12.3 |
| 85 | 480 | 5.2 | 1.65 | 13.0 |

EXAMPLE 3

Three (3) Kg of Fluon CD-4 (made by Imperial Chemical Co.) and 0.78 Kg of Smoil P-55 were employed. A mandrel 6 mm in outside diameter, a core pin 6 mm in outside diameter, a die having an inclination angle of 60 degrees, and a die insert having an opening 8 mm in diameter and a die-land 70 mm long, were employed. In addition, a heater was built in an additional die-land 50 mm long, and the heater was energized through slip-rings and carbon brushes while the additional die-land was being rotated.

The resultant data of products extruded by changing the revolutions per minute, similarly as in Comparison Example 1, with the die and die-land heated at 40° C. and 100° C., respectively, were as indicated in Table 4.

In this example, in order to determine the degree of the fibrous state formation in the direction perpendicular to the extrusion direction, a strong fishing line was diametrically threaded through the tube at a point 10 mm from its end, whereby the strength required to tear the wall of the tube was measured by the force exerted on the line.

TABLE 4

| Extruding Condition Revolution per Minute | | | Tearing Strength by Line | |
|---|---|---|---|---|
| Mandrel rpm | Die-land rpm | Pressure $Kg/cm^2$ | Unsintered g/ply | Sintered kg/ply |
| 0 | 0 | 510 | 210 | 3.9 |
| 50 | 50 | 620 | 450 | 7.2 |
| 65 | 65 | 690 | 560 | 8.6 |
| 85 | 85 | 750 | 670 | 9.9 |

What is claimed is:

1. A method of extruding a tubing material from a mixture of polytetrafluoroethylene and a lubricant using a ram type extruding apparatus having a smooth central mandrel having a constant diameter approximately equal to the inside diameter of the extruded tubing material and a die connected to a cylinder along and within which a ram is slidable to force the mixture into the die, comprising the steps of employing said die having a die insert terminating into a die-land, with the opening diameter of said die-land being smaller than the opening diameter of said die insert terminating into said die-land, rotating at least an end portion of the die in one direction during the extrusion of the mixture into a tubing material and thermally expanding said tubing material in the die by heating at least a portion of the die to a temperature higher than the temperature of the mixture in the cylinder, whereby fibrous-state formation in the direction perpendicular to the extrusion direction is accelerated.

2. An extrusion method as set forth in claim 1, wherein the difference between the temperature of the mixture in the cylinder and the temperature of said heated portion of the die is equal to or larger than 50° C.

3. An extrusion method as set forth in claim 1, wherein said center mandrel is rotated in the opposite direction.

4. An extrusion method as set forth in claim 3, wherein the difference between the temperature of the mixture in the cylinder and the temperature of said heated portion of the die is equal to or larger than 50° C.

5. A method of extruding a tubing material from a mixture of polytetrafluoroethylene and a lubricant using a ram type extruding apparatus having a smooth central mandrel having a portion tapering from a large diameter above a die to a relatively smaller diameter approximately equal to the inside diameter of the extruded tubing material, said die connected to a cylinder along and within which a ram is slidable to force the mixture into the die, comprising the steps of employing said die having a die insert terminating into a die-land, with the opening diameter of said die-land being smaller than the opening diameter of said die insert terminating into said die-land, rotating at least an end portion of the die in one direction during the extrusion of the mixture into a tubing material and thermally expanding said tubing material in the die by heating at least a portion of the die to a temperature higher than the temperature of the mixture in the cylinder, whereby fibrous-state formation in the direction perpendicular to the extrusion direction is accelerated.

6. An extrusion method as set forth in claim 5, wherein said central mandrel is rotated in the direction opposite to that of the die rotation.

7. An extrusion method as set forth in claim 5, wherein the difference between the temperature of the mixture in the cylinder and the temperature of said heated portion of the die is equal to or larger than 50° C.

8. An extrusion method as set forth in claim 6, wherein the difference between the temperature of the mixture in the cylinder and the temperature of said heated portion of the die is equal to or larger than 50° C.

9. A method of extruding a tubing material from a mixture of polytetrafluoroethylene and a lubricant using a ram type extruding apparatus having a smooth central mandrel and a die connected to a cylinder along and within which the ram is slidable to force the mixture into the die, comprising the steps of employing said die having a die insert terminating into a die-land, rotating at least the smooth central mandrel in one direction during the extrusion of the mixture into a tubing material and thermally expanding said tubing material in the die by heating at least a portion of the die to a temperature higher than the temperature of the mixture in the cylinder, whereby fibrous-state formation in the direction perpendicular to the extrusion direction is accelerated.

10. An extrusion method as set forth in claim 9, wherein the difference between the temperature of the mixture in the cylinder and the temperature of said heated portion of the die is equal to or larger than 50° C.

11. An extrusion method as set forth in claim 9, said smooth central mandrel having a portion tapering from a large diameter above the die to a relatively smaller diameter approximately equal to the inside diameter of the extruded tubing material.

* * * * *